US012709332B2

(12) United States Patent
Grattan et al.

(10) Patent No.: US 12,709,332 B2
(45) Date of Patent: Aug. 18, 2026

(54) ANTI-POOLING COUNTERMEASURES FOR VEHICLES

(71) Applicant: Nissan North America, Inc., Franklin, TN (US)

(72) Inventors: Patrick Grattan, Wixom, MI (US); David Snyder, Southfield, MI (US)

(73) Assignee: Nissan North America, Inc., Franklin, TN (US)

( * ) Notice: Subject to any disclaimer, the term of this patent is extended or adjusted under 35 U.S.C. 154(b) by 543 days.

(21) Appl. No.: 18/323,168

(22) Filed: May 24, 2023

(65) Prior Publication Data

US 2024/0391533 A1 Nov. 28, 2024

(51) Int. Cl.
*B62D 25/08* (2006.01)

(52) U.S. Cl.
CPC .................................... *B62D 25/08* (2013.01)

(58) Field of Classification Search
CPC ....................................................... B60R 13/06
USPC .................................. 296/146.8, 146.9, 154
See application file for complete search history.

(56) References Cited

U.S. PATENT DOCUMENTS 2,793,070 A * 5/1957 Wernig .................... B60J 10/80 296/76
4,641,880 A * 2/1987 Ohkubo .................. B60J 5/101 296/76
5,209,546 A * 5/1993 Hasegawa ................ B60J 7/022 296/213
7,021,698 B2 4/2006 Yamada et al.
8,256,825 B1 * 9/2012 Dryja ........................ B60J 5/101 296/106
9,539,885 B2 * 1/2017 Kawashima ............ B60R 13/07
10,745,063 B2 * 8/2020 Takashi .................... B60J 10/24
12,012,147 B2 * 6/2024 Tsuboi ..................... B62D 21/11
2011/0252707 A1 * 10/2011 Masumoto ............... B60J 10/25 49/476.1
2020/0353992 A1 * 11/2020 Rodgers ............... B62D 35/001

FOREIGN PATENT DOCUMENTS

EP 0792216 B1 6/1999
FR 2915441 A1 * 10/2008 ............. B62D 25/02
FR 3062366 A1 * 8/2018 ............. B62D 25/07
FR 3062366 B1 * 10/2020 ............. B62D 25/07
JP 2519354 B2 * 7/1996
JP 2689704 B2 12/1997

(Continued)

OTHER PUBLICATIONS

Englsih translation of FR 3062366 (Year: 2018).*

(Continued)

*Primary Examiner* — Amy R Weisberg
*Assistant Examiner* — Veronica M Condo
(74) *Attorney, Agent, or Firm* — Young Basile Hanlon & MacFarlane, P.C

(57) ABSTRACT

A vehicle is disclosed that includes a rear door, which is movable between closed and open positions, and a vehicle body, which supports the rear door and includes an anti-pooling countermeasure that is configured to inhibit water collection between the rear door and the vehicle body. The anti-pooling countermeasure includes a trunk and a wing that extends from the trunk at an obtuse angle such that water flowing into the anti-pooling countermeasure is directed laterally outward.

20 Claims, 7 Drawing Sheets

(56) References Cited

FOREIGN PATENT DOCUMENTS

| | | | | | |
|---|---|---|---|---|---|
| JP | 5509807 | B2 * | 6/2014 | | |
| KR | 19980062931 | U | 11/1998 | | |
| WO | WO-2012039033 | A1 * | 3/2012 | ............. | B62D 25/07 |
| WO | WO-2023089681 | A1 * | 5/2023 | ................ | B60J 5/10 |

OTHER PUBLICATIONS

English translation of JP 2519354 (Year: 1996).*
English translation of JP 5509807 (Year: 2018).*
English translation of WO 2012039033 (Year: 2012).*
Translation of FR 2915441 (Year: 2008).*
U.S. Appl. No. 17/900,695, filed Aug. 21, 2022; Vehicle Roof Assembly; Inventor Patrick Grattan; 20 pages.

* cited by examiner 148
118
102
146
144
146
148
154
152
132
2
152
154
130
1

146ii
210
260ii
αii
256
Riii
258
260i
αi
142
262
146i
118
124
132
2
128
122
1
130

114
546ii
574ii
544ii
510
576ii
146ii
102
144
142
146i
576i
544i
574i
546i
256
464
112

102
574vi
576v
574v
576iv
574iv
MV
576iii
574iii
576ii
574ii
576i
574i
610

ANTI-POOLING COUNTERMEASURES FOR VEHICLES

TECHNICAL FIELD

The present disclosure relates to water drainage in vehicles and, more specifically, to anti-pooling countermeasures that are configured to direct water laterally outward along the vehicle body.

BACKGROUND

Vehicles typically include a rear door (or other such access point) that is repositionable between closed and open positions to provide access to one or more interior compartments in the vehicle (e.g., the passenger cabin, the trunk, etc.). In order to inhibit (if not entirely prevent) the entry of water into the interior compartment(s), the vehicle body and/or the rear door usually include a seal (e.g., a gasket, weatherstripping, etc.). When the vehicle is exposed to excessive water (e.g., during a heavy rain, during exterior cleaning, etc.), however, water can collect (pool) between the vehicle body and the rear door, thereby saturating the seal, which can result in water penetration and/or damage to the interior compartment(s) (e.g., the headliner in the passenger cabin).

While certain efforts have been made to combat this issue, an opportunity remains to improve upon water drainage and thereby further reduce any likelihood of water penetration.

SUMMARY

In one aspect of the present disclosure, a vehicle is disclosed that includes a rear door, which is movable between closed and open positions, and a vehicle body, which supports the rear door and includes an anti-pooling countermeasure that is configured to inhibit water collection between the rear door and the vehicle body. The anti-pooling countermeasure includes a trunk and a wing that extends from the trunk at an obtuse angle such that water flowing into the anti-pooling countermeasure is directed laterally outward.

In certain embodiments, the vehicle body may include a vertical end wall and a base wall that extends in generally orthogonal relation to the vertical end wall.

In certain embodiments, the anti-pooling countermeasure may extend from the vertical end wall to the base wall.

In certain embodiments, the anti-pooling countermeasure may protrude outwardly from the vehicle body.

In certain embodiments, the anti-pooling countermeasure may be recessed into the vehicle body.

In certain embodiments, the anti-pooling countermeasure may include an open end to allow water to drain therefrom.

In certain embodiments, the anti-pooling countermeasure may be unitarily formed with the vehicle body such that the vehicle body and the anti-pooling countermeasure are formed from a single piece of material.

In certain embodiments, the vehicle body and the anti-pooling countermeasure may be configured as discrete components of the vehicle.

In certain embodiments, the anti-pooling countermeasure may include a first diverter and a second diverter that is spaced from the first diverter.

In certain embodiments, the first diverter and the second diverter may be spaced axially from each other along a length of the vehicle body.

In certain embodiments, the first diverter and the second diverter may be spaced laterally from each other along a width of the vehicle body.

In another aspect of the present disclosure, a vehicle is disclosed that includes: a rear door that is movable between closed and open positions; a vehicle body that supports the rear door; and an anti-pooling countermeasure that is supported by the vehicle body and which is configured to direct water laterally outward along the vehicle body to inhibit water collection between the vehicle body and the rear door. The anti-pooling countermeasure extends at an obtuse angle in relation to a reference axis that extends in generally parallel relation to a length of the vehicle body.

In certain embodiments, the anti-pooling countermeasure may include a first diverter and a second diverter that is spaced from the first diverter.

In certain embodiments, the first diverter and the second diverter may define an axial gap therebetween that extends in generally parallel relation to the length of the vehicle body.

In certain embodiments, the first diverter and the second diverter may be connected such that the anti-pooling countermeasure includes an outer wall that extends continuously therebetween.

In certain embodiments, the second diverter may be nested within the first diverter.

In certain embodiments, the first diverter and the second diverter may define a lateral gap therebetween that extends in generally parallel relation to the width of the vehicle body.

In another aspect of the present disclosure, a method is disclosed for inhibiting water collection between a vehicle body and a rear door that is connected to the vehicle body. The method includes directing water via an anti-pooling countermeasure that is supported by the vehicle body such that the water flows at an obtuse angle in relation to a reference axis extending in generally parallel relation to a length of the vehicle body.

In certain embodiments, directing water via the anti-pooling countermeasure may include directing water via a diverter that protrudes outwardly from the vehicle body.

In certain embodiments, directing water via the anti-pooling countermeasure may include directing water through a diverter that is recessed into the vehicle body.

In certain embodiments, directing water via the anti-pooling countermeasure may include directing water via a first diverter and directing water via a second diverter that is spaced from the first diverter.

BRIEF DESCRIPTION OF THE DRAWINGS

According to common practice, the various features of the drawings may not be to scale and may be arbitrarily expanded or reduced for clarity.

DETAILED DESCRIPTION

Figure 1:
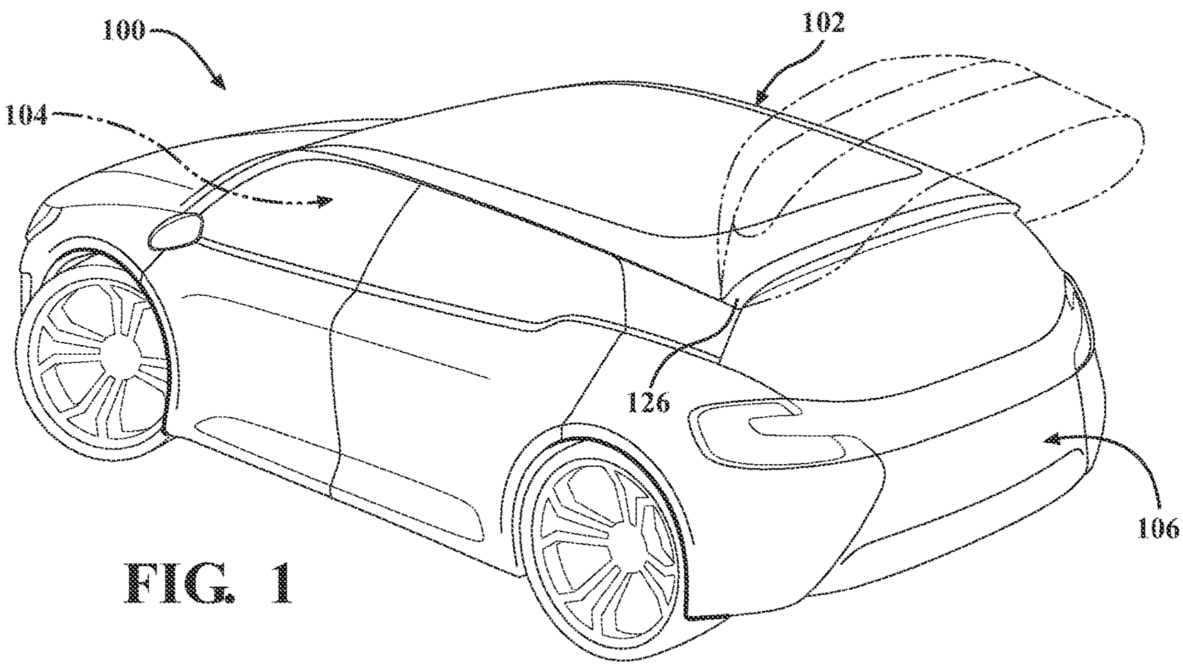
FIG. 1 is a rear, perspective view of a vehicle including a vehicle body, a rear door, and an anti-pooling countermeasure in accordance with the principles of the present disclosure, which is configured to inhibit water collection between the vehicle body and the rear door.
Figure 2:
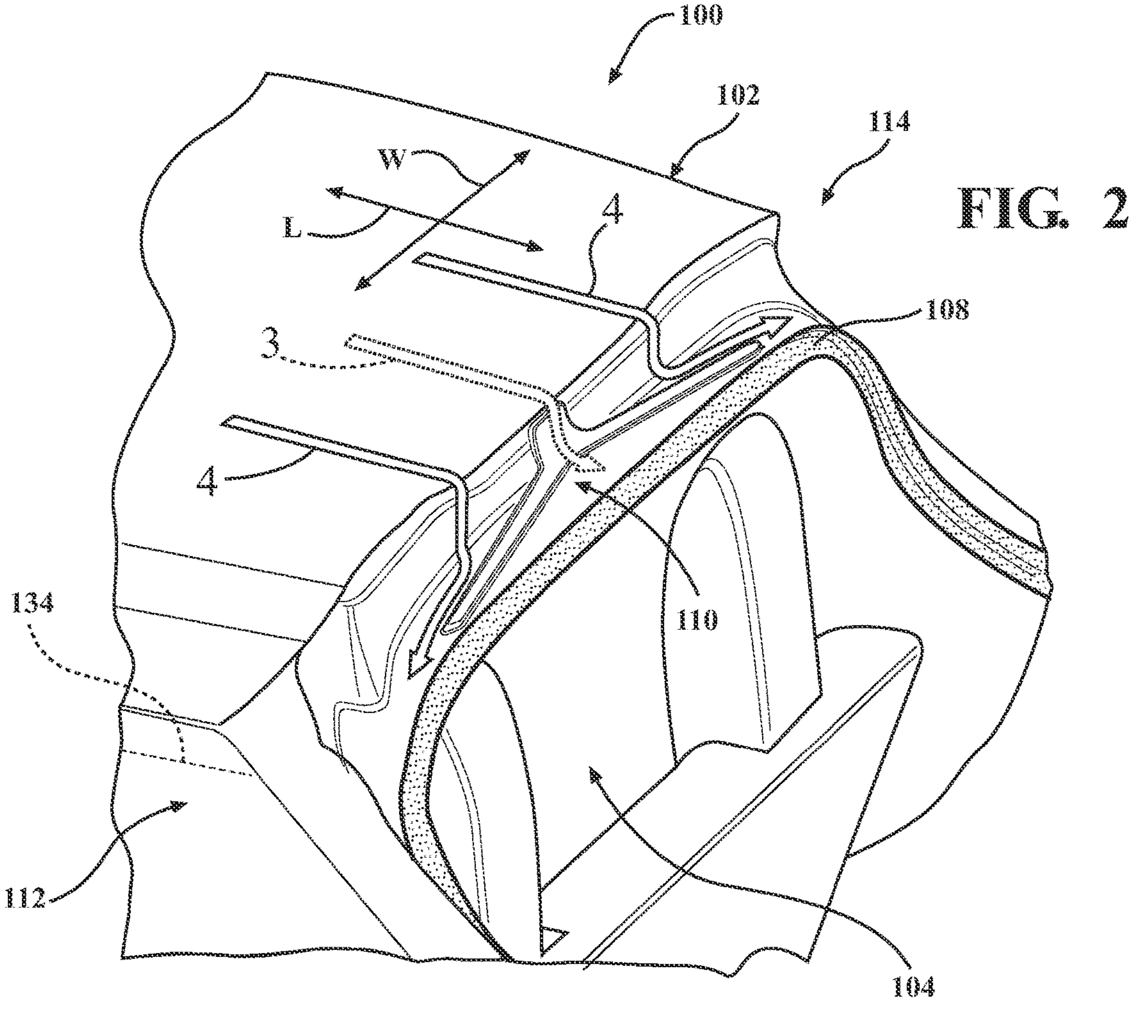
FIG. 2 is a partial, rear, perspective view of the vehicle with the rear door removed and illustrating the anti-pooling countermeasure, which includes a first diverter that protrudes from the vehicle body.

The present disclosure describes an anti-pooling countermeasure for a vehicle that is configured to direct water outboard (e.g., laterally outward) along the vehicle body and thereby inhibit water collection between the vehicle body and a rear door of the vehicle. To facilitate the outboard flow of water, the anti-pooling countermeasure includes a diverter with a trunk and at least one wing that extends laterally outward from the trunk. More specifically, the wing(s) extend at an obtuse angle in relation to a reference axis that is oriented in (generally) parallel relation to a length of the vehicle body.

With reference to FIGS. 1-4, a vehicle 100 is illustrated that includes a vehicle body 102 defining a passenger cabin 104; a rear door 106 that is supported by (e.g., hingedly connected to) the vehicle body 102 such that the rear door 106 is movable between closed and open positions; a seal 108 (e.g., a gasket, weatherstripping, etc.); and an anti-pooling countermeasure 110. While the vehicle 100 is generally illustrated and described as a passenger vehicle throughout the present disclosure, it should be appreciated that the present disclosure may find applicability to a wide variety of vehicles including, for example, trucks, SUVs, vans, etc. Additionally, while the anti-pooling countermeasure 110 is described in connection with the rear door 106, it should be appreciated that the principles of the anti-pooling countermeasure 110 are equally applicable to a variety of other such access points (e.g., a hatch, a trunk, a deck lid, a tailgate, etc.).

Figure 3:
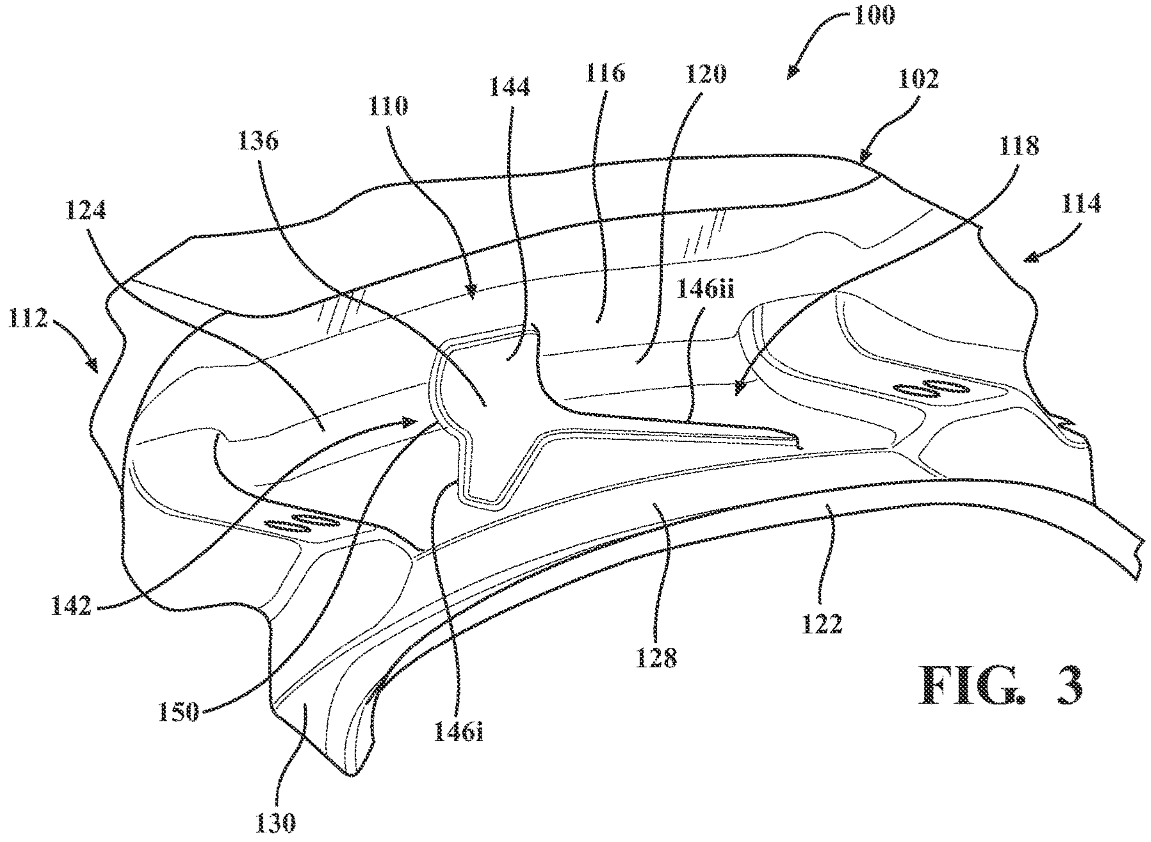
FIG. 3 is a partial, rear, perspective view of the vehicle illustrating the anti-pooling countermeasure.
Figure 4:
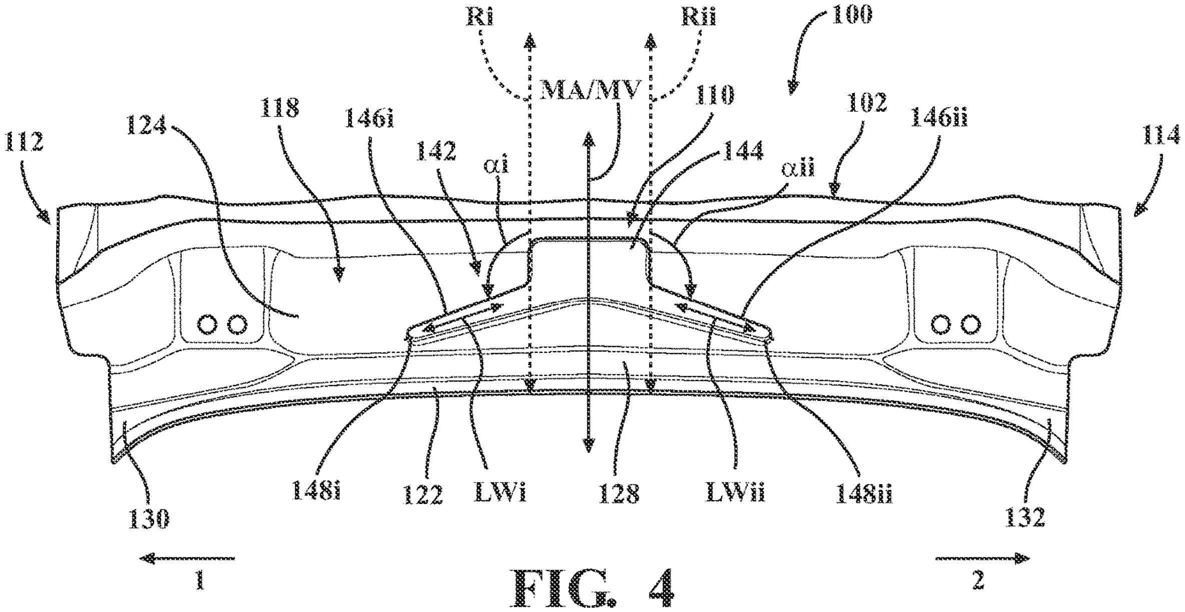
FIG. 4 is a partial, top, perspective view of the vehicle illustrating the anti-pooling countermeasure.

The vehicle body 102 defines an (axial) length L (FIG. 2) and a (lateral) width W and includes: opposite lateral ends 112, 114; a (vertical) end wall 116; a base wall 118; a transition (bridge) 120, which connects the end wall 116 and the base wall 118; and an (upstanding) flange 122, which collectively define a recess 124 that is configured to accommodate (e.g., receive) an upper end 126 (FIG. 1) of the rear door 106. More specifically, the end wall 116 extends in (generally) orthogonal relation to the length L and the width W of the vehicle body 102, the base wall 118 extends from the end wall 116 in (generally) orthogonal relation to the end wall 116 and in (generally) parallel relation to the length L of the vehicle body 102, and the flange 122 extends (vertically) from the base wall 118 in (generally) orthogonal relation thereto. As seen in FIGS. 3 and 4, the base wall 118 includes a central portion 128, which is (generally) linear (flat, planar) in configuration, and lateral portions 130, 132, which are non-linear (e.g., curved, arcuate) in configuration and extend outboard (e.g., laterally outward) from the central portion 128 in the directions respectively identified by the arrows 1, 2 (FIG. 4).

The seal 108 (FIG. 2) is supported by (e.g., is connected, attached to) the flange 122 (FIGS. 3, 4) and extends laterally across the vehicle body 102 (e.g., in the outboard directions 1, 2). The seal 108 is configured to inhibit (if not entirely prevent) water from leaking into one or more interior compartments of the vehicle 100 (e.g., the passenger cabin 104) and may include any material(s) of construction suitable for that intended purpose (e.g., one or more polymeric materials, one or more metallic materials, rubber, etc.).

The anti-pooling countermeasure 110 facilitates water drainage and inhibits (if not entirely prevents) the collection (pooling) of water between the vehicle body 102 and the rear door 106 (e.g., within the recess 124) when the vehicle 100 is exposed to excessive water (e.g., during a heavy rain, during exterior cleaning, etc.). As described in further detail below, the anti-pooling countermeasure 110 directs water laterally outward (e.g., in the outboard directions 1, 2 along the vehicle body 102 in order to reduce the amount of water that comes into contact with the seal 108 that would otherwise occur in the absence of the anti-pooling countermeasure 110. More specifically, arrow 3 (FIG. 2) represents the flow of water in the absence of the anti-pooling countermeasure 110, and arrows 4 represent the flow of water as altered by the anti-pooling countermeasure 110. By reducing the amount of water that comes into contact with the seal 108, the anti-pooling countermeasure 110 guards against saturation of the seal 108 and thereby inhibits (if not entirely prevents) water penetration into the vehicle 100 (e.g., the passenger cabin 104) and, thus, any damage that may otherwise occur as a result of such water penetration (e.g., to a headliner 134 (FIG. 2) in the passenger cabin 104).

Figure 5:
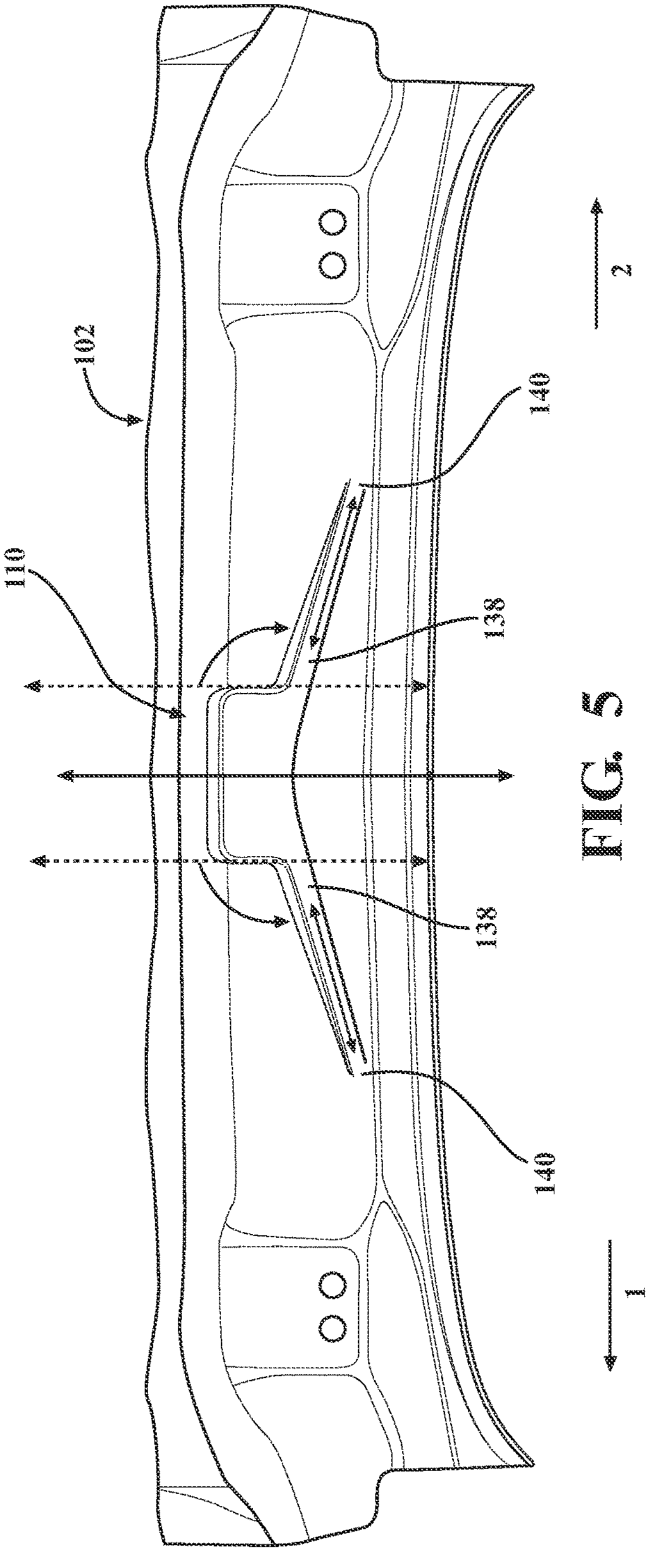
FIG. 5 is a partial, top, perspective view of the vehicle including an alternate embodiment of the anti-pooling countermeasure in which the first diverter is recessed into the vehicle body.

In certain embodiments of the disclosure, it is envisioned that the anti-pooling countermeasure 110 may be a dual-purpose component of the vehicle 100. More specifically, in addition to directing the flow of water in the manner described herein, it is envisioned that the anti-pooling countermeasure 110 may be configured to increase the strength, rigidity, and/or the stiffness of the vehicle body 102. For example, in the illustrated embodiment, the anti-pooling countermeasure 110 protrudes outwardly from the vehicle body 102 and is configured as an emboss 136, which may be formed through any suitable method of manufacture (e.g., via stamping). Alternatively, it is envisioned that that the anti-pooling countermeasure 110 may be formed through the additional of supplemental material to the vehicle body 102. FIG. 5, however, illustrates an alternate embodiment of the disclosure in which the anti-pooling countermeasure 110 is recessed into the vehicle body 102 so as to define one or more channels 138 that are configured to receive and direct water. In such embodiments, the channel(s) 138 include open end(s) 140, which allows the water being directed through the anti-pooling countermeasure 110 to drain therefrom in the outboard directions 1, 2.

In the illustrated embodiment, the anti-pooling countermeasure 110 is supported by the vehicle body 102 and is a component thereof. More specifically, the anti-pooling countermeasure 110 is unitarily formed with the vehicle body 102 (e.g., via stamping) such that the vehicle body 102 and the anti-pooling countermeasure 110 are formed from a single piece of (metallic) material. Alternatively, however, it is envisioned that the vehicle body 102 and the anti-pooling countermeasure 110 may be configured as discrete components of the vehicle 100. For example, it is envisioned that the anti-pooling countermeasure 110 may applied to the vehicle body 102 following manufacture (e.g., via an adhesive). In such embodiments, it is envisioned that the anti-pooling countermeasure 110 may include any suitable material or combination of materials, whether metallic or non-metallic. As such, the present disclosure envisions embodiments in which the vehicle body 102 and the anti-pooling countermeasure 110 may include (e.g., may be formed from) the same (metallic) material or dissimilar materials. For example, it is envisioned that the vehicle body 102 may include (e.g., may be formed from) a metallic material and that the anti-pooling countermeasure 110 may be include (e.g., may be formed from) a non-metallic material (e.g., one or more plastics, polymeric materials, etc.).

The anti-pooling countermeasure 110 includes a first (primary) first diverter 142, which is spaced (axially) from the flange 122 and the seal 108 along the length L of the vehicle body 102 and is (generally) centered along the width W thereof (e.g., such that a midline MA of the anti-pooling countermeasure 110 is (generally) aligned with a midline MV of the vehicle body 102). The first diverter 142 includes a trunk 144 and at least one wing 146 that extends laterally outward from the trunk 144. For example, in the illustrated embodiment, the anti-pooling countermeasure 110 includes a (first) wing **146*i*, which extends from the trunk 144 in the outboard direction 1, and a (second) wing 146*ii*, which extends from the trunk 144 in the outboard direction 2. More specifically, the wings 146*i*, 146*ii* extend from the trunk 144 at respective (first and second) obtuse angles αi, αii, which are defined in relation to corresponding reference axes Ri, Rii that extend in (generally) parallel relation to the length L (FIG. 2) of the vehicle body 102**.

Although shown as including a pair of wings 146, embodiments of the anti-pooling countermeasure 110 (e.g., the first diverter 142) including both greater and fewer numbers of wings 146 would not be beyond the scope of the present disclosure (e.g., depending upon the particular configuration of the vehicle body 102, spatial constraints, etc.). For example, an embodiment of a diverter including a single wing is also envisioned herein, as described in further detail below (see FIG. 14).

Figure 6:
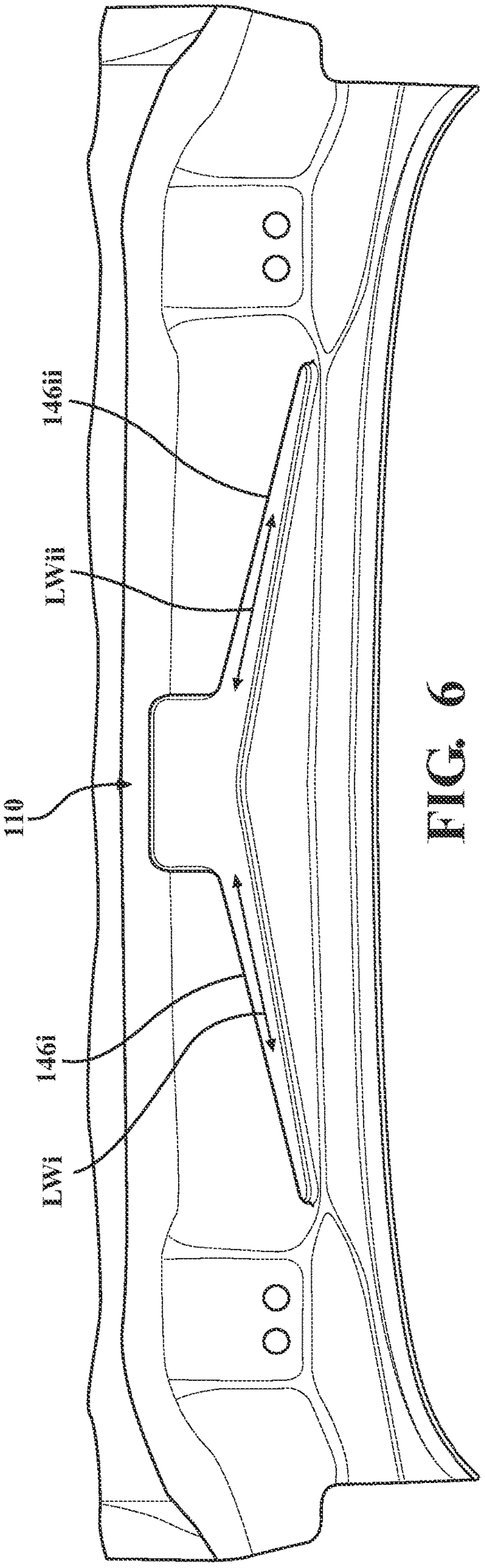
FIG. 6 is a partial, top, perspective view of the vehicle including an alternate embodiment of the anti-pooling countermeasure in which the first diverter is enlarged (elongated).

As seen in FIG. 4, the wings **146*i*, 146*ii* define respective lengths LWi, LWii. In the illustrated embodiment, the first diverter 142 is configured such that the lengths LWi, LWii lie substantially within the range of (approximately) 8" to (approximately) 16", whereby the wings 146*i*, 146*ii* include respective terminal ends 148*i*, 148*ii* that are spaced inwardly from the lateral ends 112, 114 of the vehicle body 102. Embodiments in which the lengths LWi, LWii may be increased or decreased are also envisioned herein, however, and would not be beyond the scope of the present disclosure. Embodiments of the anti-pooling countermeasure 110 in which the first diverter 142 may be enlarged (e.g., elongated) by increasing the lengths LWi, LWii of the respective wings 146*i*, 146*ii* such that they lie (substantially) within the range of (approximately) 24" to (approximately) 36" is also envisioned herein, however, as illustrated in FIG. 6, as are embodiments in which the first diverter 142 may be configured such that the respective terminal ends 148*i*, 148*ii* of the wings 146*i*, 146*ii* extend to the lateral ends 112, 114 of the vehicle body 102**.

In the embodiment illustrated in FIGS. 3 and 4, the anti-pooling countermeasure 110 extends from the end wall 116 to the base wall 118. More specifically, the trunk 144 extends from the end wall 116, across the transition 120, and onto the base wall 118. Embodiments in which the anti-pooling countermeasure 110 may be confined to the transition 120 and the base wall 118 are also envisioned herein, however, as are embodiments in which the anti-pooling countermeasure 110 may be confined solely to the base wall 118, and would not be beyond the scope of the present disclosure.

With reference again to FIGS. 1-4, use and operation of the anti-pooling countermeasure 110 will be discussed. Upon entering the recess 124 (FIGS. 3, 4), as water flows into contact with the anti-pooling countermeasure 110, the water is directed laterally outward (e.g., along an outer wall (contour, perimeter) 150 (FIG. 3) of the first diverter 142), which is facilitated by the angled configuration of the wings 146. More specifically, under the influence of gravity, the water flows along the first diverter 142 (e.g., at the obtuse angles αi, αii (FIG. 4)) and across the central portion 128 of the base wall 118 in the outboard directions 1, 2. Upon reaching the lateral portions 130, 132 of the base wall 118, the non-linear (e.g., curved, arcuate) configurations thereof causes the water to be shed laterally, under the continued influence of gravity, which inhibits (if not entirely prevents) the water from contacting and saturating the seal 108, thus guarding against water penetration into the vehicle 100 and damage (e.g., to the headliner 134 (FIG. 2) in the passenger cabin 104) that may otherwise occur.

Figure 7:
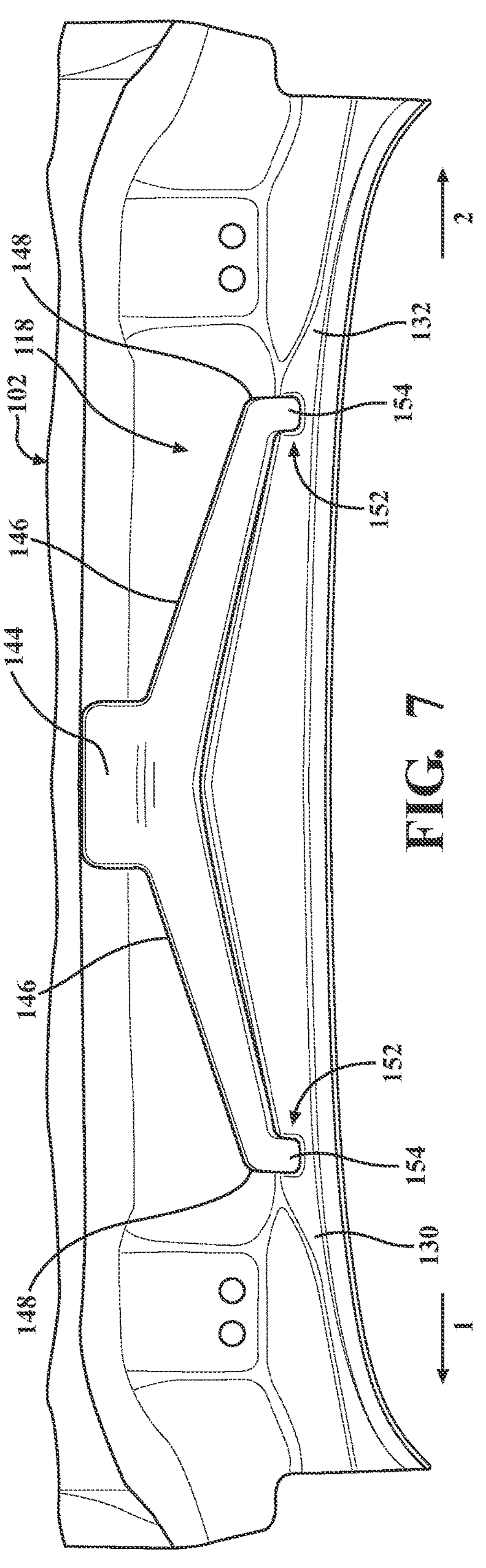
FIG. 7 is a partial, top, perspective view of the vehicle including an alternate embodiment of the anti-pooling countermeasure, which includes extensions that define drip-tips.

In certain embodiments, it is envisioned that the terminal ends 148 of the wings 146 may include extensions 152 that are oriented in (generally) parallel relation the trunk 144 (and the length L of the vehicle body 102), as seen in FIG. 7. The extensions 152 define (provide) drip-tips 154 that are configured and positioned to direct water onto the lateral portions 130, 132 of the base wall 118, which encourages the flow of water laterally outward along the vehicle body 102 in the outboard directions 1, 2, as discussed above.

Figure 8:
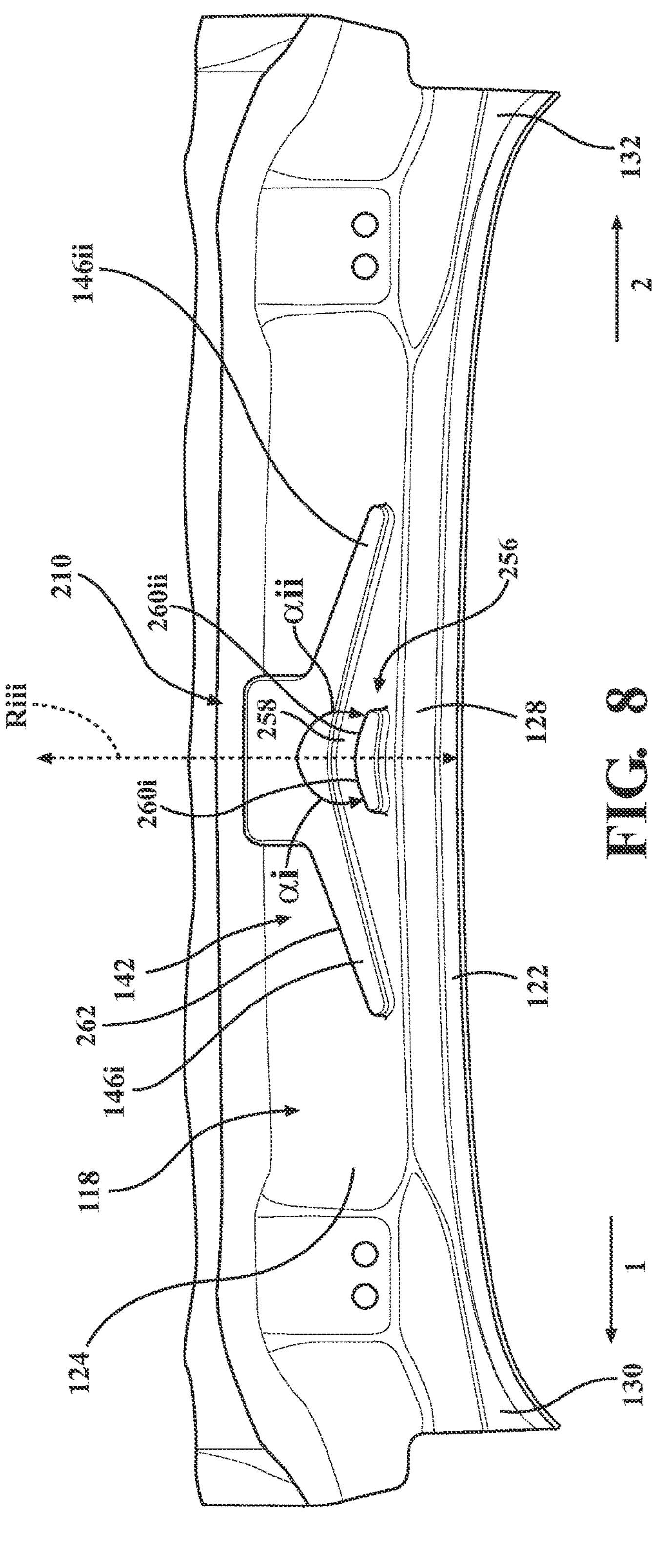
FIG. 8 is a partial, top, perspective view of the vehicle including an alternate embodiment of the anti-pooling countermeasure, which includes a second diverter.

With reference now to FIG. 8, an anti-pooling countermeasure 210 will be discussed, which is an alternate embodiment of the anti-pooling countermeasure 110. The anti-pooling countermeasure 210 is substantially similar in both structure and function to the aforedescribed anti-pooling countermeasure 110 (FIGS. 1-4) and, accordingly, will only be discussed with respect to differences therefrom in the interest of brevity. As such, identical reference characters will be utilized to refer to elements, structures, features, etc., common to the anti-pooling countermeasure 110 and the anti-pooling countermeasure 210.

In addition to the first diverter 142, the anti-pooling countermeasure 210 includes a second (secondary) diverter

256, which accommodates for increased volumes of water. As seen in FIG. 8, the second diverter 256 is nested within the first diverter 142 such that the second diverter 256 is located between the wings 146*i*, 146*ii* and is spaced therefrom along the length L of the vehicle body 102, whereby the diverters 142, 256 define an (axial) gap 258 therebetween that extends in (generally) parallel relation to the length L of the vehicle body 102.

The second diverter 256 includes a generally chevron-shaped configuration that is defined by a pair of legs 260*i*, 260*ii*. More specifically, in the illustrated embodiment, the legs 260*i*, 260*ii* extend laterally outward in (generally) parallel relation to the wings 146*i*, 146*ii* of the first diverter 142 and, thus, extend at the obtuse angles αi, αii, which are measured in relation to a reference axis Riii that extends in (generally) parallel relation to the length L (FIG. 2) of the vehicle body 102. Embodiments in which the legs 260 and the wings 146 may extend in non-parallel relation, however, are also envisioned herein and would not be beyond the scope of the present disclosure.

Figure 9:
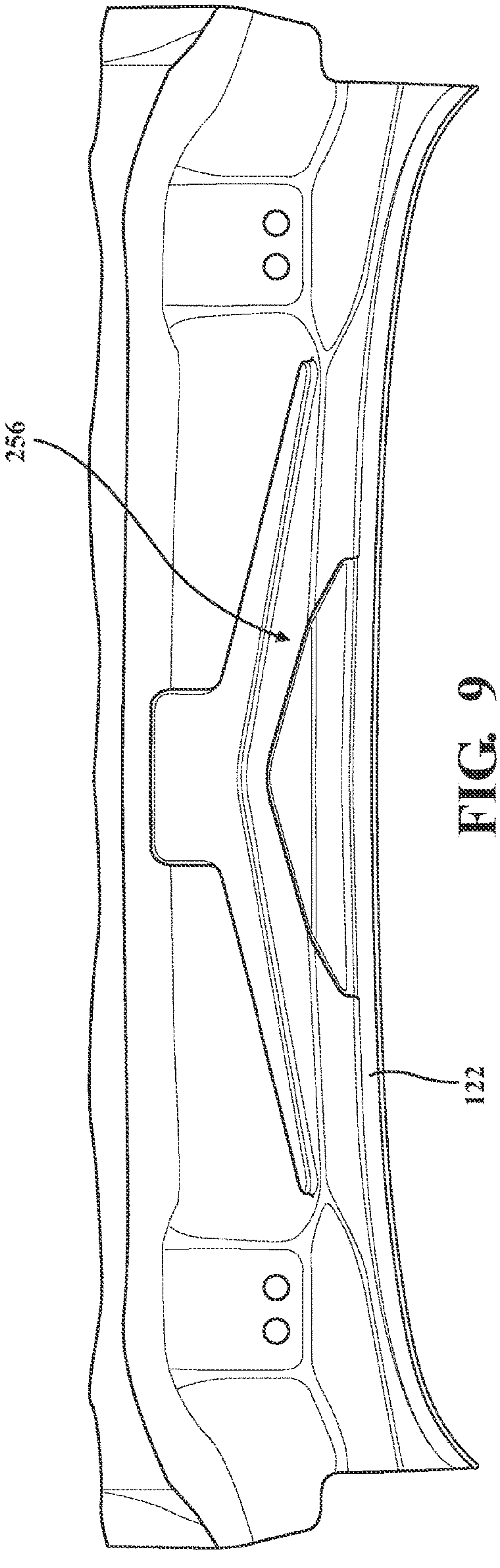
FIG. 9 is a partial, top, perspective view of the vehicle including an alternate embodiment of the anti-pooling countermeasure seen in FIG. 8 in which the second diverter is enlarged.

Like the first diverter 142, the second diverter 256 is (generally) centered along the width W of the vehicle body 102 and is spaced (axially) from the flange 122 and the seal 108 (FIG. 2) along the length L of the vehicle body 102. Embodiments in which the second diverter 256 may be enlarged and/or repositioned so as to extend into contact with the flange 122 are also envisioned herein, however, as illustrated in FIG. 9, and would not be beyond the scope of the present disclosure.

With reference again to FIG. 8, upon entering the recess 124, any water that traverses the first diverter 142 (e.g., water that travels across the first diverter 142 and towards the flange 122 and the seal 108) flows into contact with the second diverter 256 and is directed laterally outward (e.g., along an outer wall (contour, perimeter) 262 of the second diverter 256), which is facilitated by the angled configurations of the legs 260. The anti-pooling countermeasure 210 thus directs water laterally outward via the first diverter 142 and the second diverter 256. More specifically, under the influence of gravity, the water traversing the first diverter 142 flows into and along the second diverter 256 (e.g., at the obtuse angles αi, αii) and across the central portion 128 of the base wall 118 in the outboard directions 1, 2 to the lateral portions 130, 132. Upon reaching the lateral portions 130, 132 of the base wall 118, the water is shed laterally in the manner discussed above with respect to the first diverter 142, thereby further inhibiting (if not entirely preventing) the water from contacting and saturating the seal 108.

Figure 10:
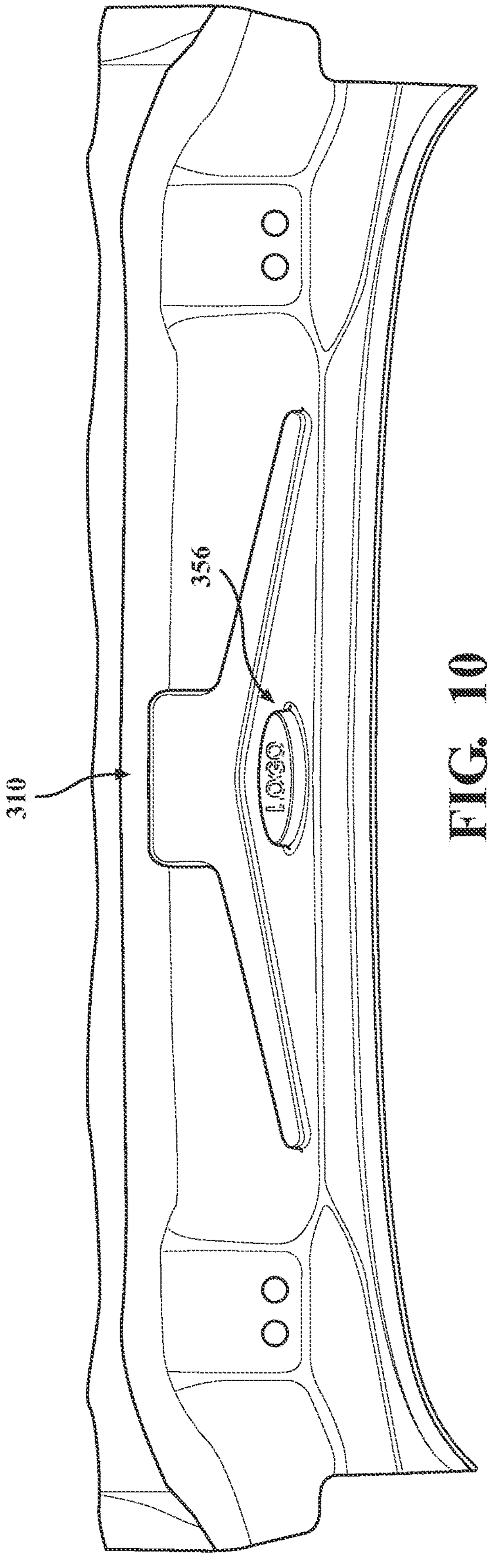
FIG. 10 is a partial, top, perspective view of the vehicle including an alternate embodiment of the anti-pooling countermeasure seen in FIG. 8 in which the second diverter is configured as a logo (or other such decorative element).

With reference now to FIG. 10, an anti-pooling countermeasure 310 will be discussed, which is an alternate embodiment of the anti-pooling countermeasure 210. The anti-pooling countermeasure 310 is substantially similar in both structure and function to the aforedescribed anti-pooling countermeasure 210 (FIG. 8) and, accordingly, will only be discussed with respect to differences therefrom in the interest of brevity. As such, identical reference characters will be utilized to refer to elements, structures, features, etc., common to the anti-pooling countermeasure 210 and the anti-pooling countermeasure 310.

In contrast to the anti-pooling countermeasure 210, in which the second diverter 256 includes the aforedescribed generally chevron-shaped configuration, the anti-pooling countermeasure 310 includes a (second) diverter 356 that is configured as a logo (or other such decorative element), which may be utilized to identify the make and/or the model of the vehicle 100 (FIG. 1).

Figure 11:
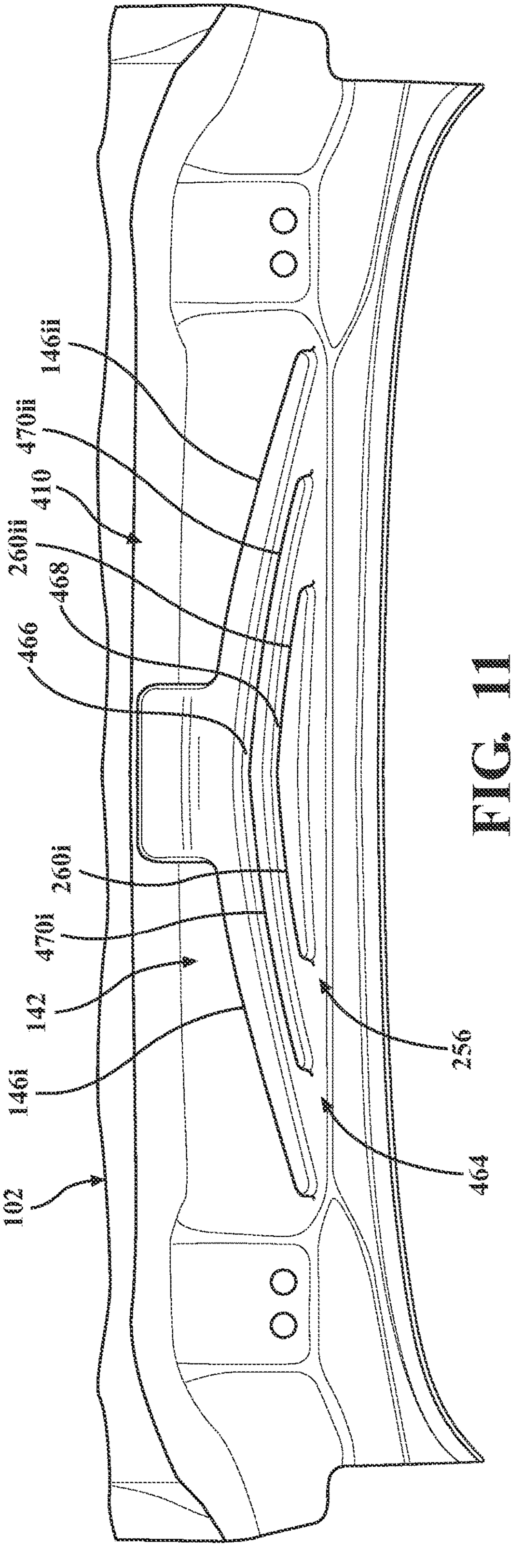
FIG. 11 is a partial, top, perspective view of the vehicle including an alternate embodiment of the anti-pooling countermeasure seen in FIG. 8, which includes a third diverter.

With reference now to FIG. 11, an anti-pooling countermeasure 410 will be discussed, which is an alternate embodiment of the anti-pooling countermeasure 210. The anti-pooling countermeasure 410 is substantially similar in both structure and function to the aforedescribed anti-pooling countermeasure 210 (FIG. 8) and, accordingly, will only be discussed with respect to differences therefrom in the interest of brevity. As such, identical reference characters will be utilized to refer to elements, structures, features, etc., common to the anti-pooling countermeasure 210 and the anti-pooling countermeasure 410.

In addition to the diverters 142, 256, the anti-pooling countermeasure 410 includes a third (tertiary) diverter 464, which further accommodates for increased volumes of water. The third diverter 464 is located between, and is spaced axially from, the diverters 142, 256 such that the diverters 256, 464 are nested within the first diverter 142. More specifically, the anti-pooling countermeasure 410 is configured such that the third diverter 464 is spaced from the diverters 142, 256 along the length L of the vehicle body 102 so as to define respective (first and second) (axial) gaps 466, 468 therebetween.

In the illustrated embodiment, the anti-pooling countermeasure 410 is configured such that the gaps 466, 468 are (generally) equivalent. Embodiments in which the gaps 466, 468 may be unequal, however, would not be beyond the scope of the present disclosure. For example, an embodiment in which the gap 466 exceeds the gap 468 is also envisioned herein, as is an embodiment in which the gap 468 exceeds the gap 466.

Like the second diverter 256, the third diverter 464 includes a generally chevron-shaped configuration that is defined by a pair of legs 470*i*, 470*ii*. More specifically, in the illustrated embodiment, the legs 470*i*, 470*ii* extend laterally outward in (generally) parallel relation to the wings 146*i*, 146*ii* of the first diverter 142 and in (generally) parallel relation to the legs 260*i*, 260*ii* of the second diverter 256, respectively. Embodiments in which the legs 470, the legs 260, and the wings 146 may extend in non-parallel relation, however, are also envisioned herein and would not be beyond the scope of the present disclosure.

Figure 12:
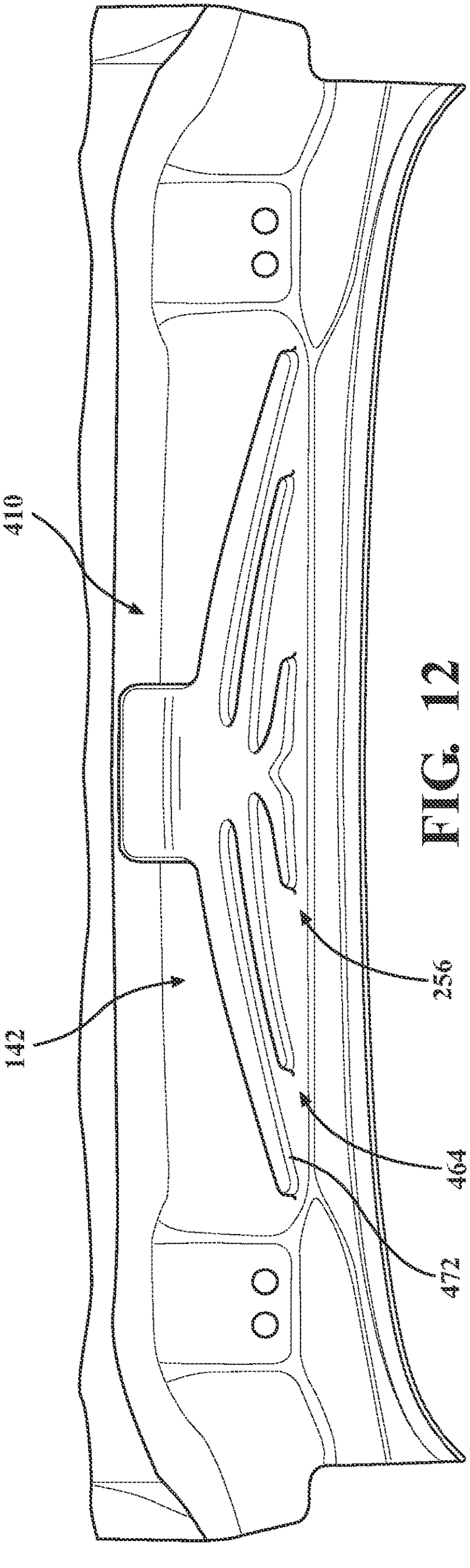
FIG. 12 is a partial, top, perspective view of the vehicle including an alternate embodiment of the anti-pooling countermeasure seen in FIG. 11 in which the first diverter, the second diverter, and the third diverter are (directly) connected.

In the illustrated embodiment, the diverters 142, 256, 464 are configured as discrete components that are disconnected from each other (other than by the material comprising the vehicle body 102). Embodiments in which the diverters 142, 256, 464 may be connected, however, are also envisioned herein. For example, FIG. 12 illustrates an embodiment in which the diverters 142, 256, 464 are configured such that the anti-pooling countermeasure 410 includes an outer wall (contour, perimeter) 472 that extends continuously between the diverters 142, 256, 464 (e.g., such that the diverters 142, 256, 464 are directly connected by the outer wall 472).

Figure 13:
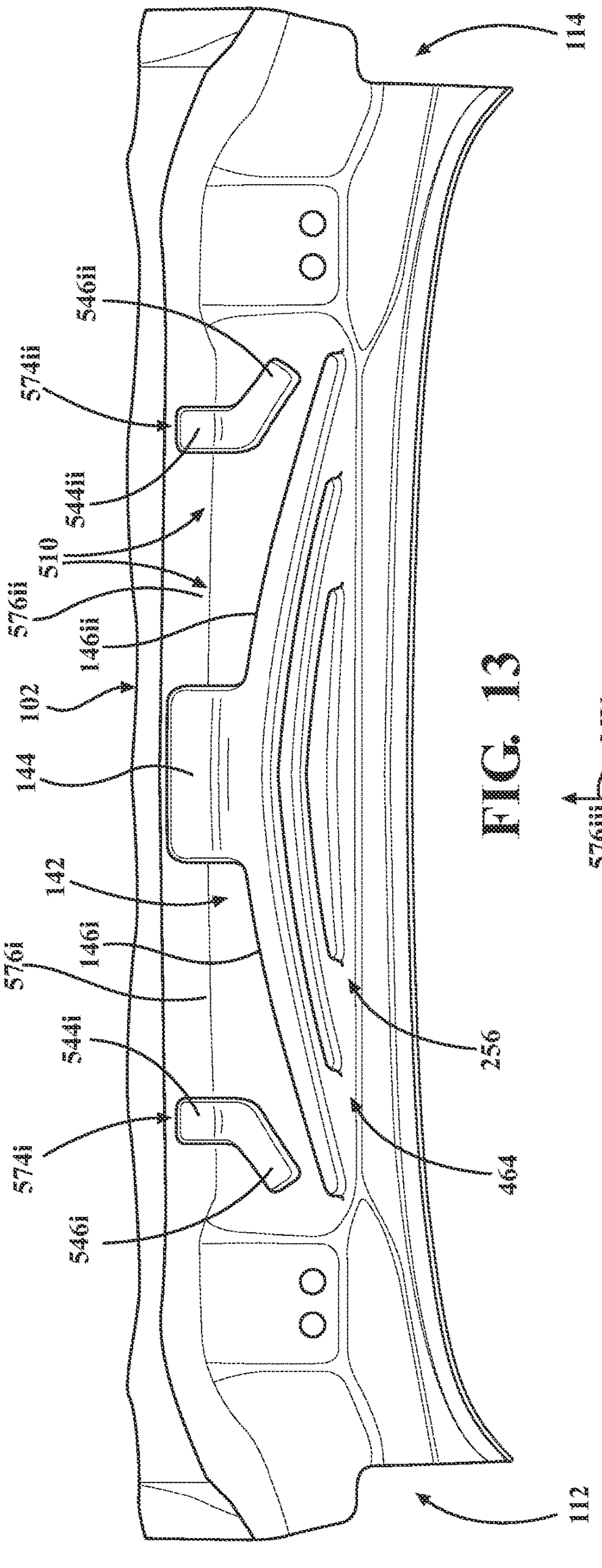
FIG. 13 is a partial, top, perspective view of the vehicle including an alternate embodiment of the anti-pooling countermeasure seen in FIG. 11, which includes one or more fourth diverters.

FIG. 13 illustrates an anti-pooling countermeasure 510, which is an alternate embodiment of the anti-pooling countermeasure 410. The anti-pooling countermeasure 510 is substantially similar in both structure and function to the aforedescribed anti-pooling countermeasure 410 (FIG. 11) and, accordingly, will only be discussed with respect to differences therefrom in the interest of brevity. As such, identical reference characters will be utilized to refer to elements, structures, features, etc., common to the anti-pooling countermeasure 410 and the anti-pooling countermeasure 510.

In addition to the diverters 142, 256, 464, the anti-pooling countermeasure 510 includes one or more fourth (quaternary) diverters 574, which further accommodates for increased volumes of water. Although shown as including a pair of fourth diverters 574*i*, 574*ii*, embodiments of the anti-pooling countermeasure 510 including both greater and fewer numbers of fourth diverters 574 would not be beyond the scope of the present disclosure (e.g., depending upon the particular configuration of the vehicle body 102, spatial constraints, etc.). For example, an embodiment of the anti-pooling countermeasure 510 including a single fourth diverter 574 is also envisioned herein, as are embodiments including three or more of the fourth diverters 574.

The fourth diverters 574*i*, 574*ii* are located laterally outward of the diverters 142, 256, 464 and are spaced laterally from the first diverter 142 along the width W of the vehicle body 102 such that the fourth diverters 574*i*, 574*ii* define respective (lateral) gaps 576*i*, 576*ii* therewith, which extend in (generally) parallel relation to the length W of the vehicle body 102.

The fourth diverters 574 each include a generally chevron-shaped configuration that is defined by a trunk 544 and a wing 546 that extends laterally outward from the trunk 544. More specifically, in the illustrated embodiment, the fourth diverter 574*i* includes a trunk 544*i* that extends in (generally) parallel relation to the trunk 144 of the first diverter 142 and a wing 546*i* that extends toward the lateral end 112 of the vehicle body 102 in (generally) parallel relation to the wing 146*i* of the first diverter 142, and the fourth diverter 574*ii* includes a trunk 544*ii* that extends in (generally) parallel relation to the trunk 144 of the first diverter 142 (and the trunk 544*i* of the fourth diverter 574*i*) and a wing 546*ii* that extends toward the lateral end 114 of the vehicle body 102 in (generally) parallel relation to the wing 146*ii* of the first diverter 142. Embodiments in which the wings 546*i*, 546*ii* may extend in non-parallel relation to the respective wings 146, 146*ii*, however, are also envisioned herein and would not be beyond the scope of the present disclosure.

Figure 14:
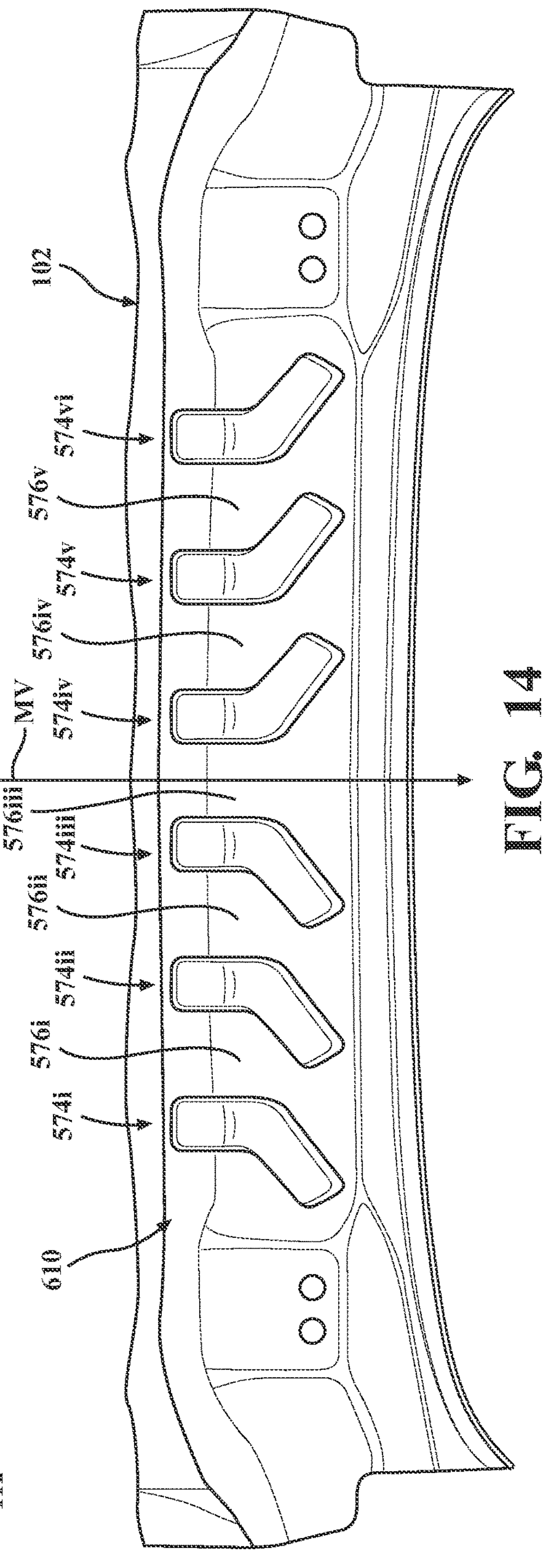
FIG. 14 is a partial, top, perspective view of the vehicle including an alternate embodiment of the anti-pooling countermeasure, which includes a plurality of the fourth diverters seen in FIG. 13.

FIG. 14 illustrates an anti-pooling countermeasure 610, which includes a plurality of the aforedescribed diverters 574 that are spaced laterally from each other along the width W of the vehicle body 102. Although shown as including a six diverters 574*i*-574*vi* that define five (lateral) gaps 576*i*-576*v* therebetween, which extend in (generally) parallel relation to the length W of the vehicle body 102, embodiments of the anti-pooling countermeasure 610 including both greater and fewer numbers of diverters 574 would not be beyond the scope of the present disclosure (e.g., depending upon the particular configuration of the vehicle body 102).

In the illustrated embodiment, the diverters 574*i*, 574*ii*, 574*iii* and the diverters 574*iv*, 574*v*, 574*vi* are configured as mirror images of each other such that the anti-pooling countermeasure 610 is symmetrical about the midline MV of the vehicle body 102. Embodiments in which the anti-pooling countermeasure 510 may be asymmetrical in configuration are also envisioned herein, however, and would not be beyond the scope of the present disclosure.

Persons skilled in the art will understand that the various embodiments of the disclosure described herein and shown in the accompanying figures constitute non-limiting examples, and that additional components and features may be added to any of the embodiments discussed herein above without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 182°±25% (e.g., an angle that lies within the range of (approximately) 135° to (approximately)) 225° and the term "generally orthogonal" should be understood as referring to configurations in with the pertinent components are oriented so as to define an angle therebetween that is equal to 90°±25% (e.g., an angle that lies within the range of (approximately) 67.5° to (approximately)) 112.5°. The term "generally parallel" should thus be understood as referring to encompass configurations in which the pertinent components are arranged in parallel relation, and the term "generally orthogonal" should thus be understood as referring to encompass configurations in which the pertinent components are arranged in orthogonal relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vehicle comprising:

a rear door movable between closed and open positions; and a vehicle body supporting the rear door and including an anti-pooling countermeasure configured to inhibit water collection between the rear door and the vehicle body, wherein the anti-pooling countermeasure is unitarily formed with the vehicle body and includes:

a trunk; and a wing extending from the trunk at an obtuse angle such that water flowing into the anti-pooling countermeasure is directed laterally outward.

2. The vehicle of claim 1, wherein the vehicle body includes:

a vertical end wall; and a base wall extending in generally orthogonal relation to the vertical end wall, the anti-pooling countermeasure extending from the vertical end wall to the base wall.

3. The vehicle of claim 1, wherein the anti-pooling countermeasure protrudes outwardly from the vehicle body.

4. The vehicle of claim 1, wherein the anti-pooling countermeasure is recessed into the vehicle body.

5. The vehicle of claim 4, wherein the anti-pooling countermeasure includes an open end to allow water to drain therefrom.

6. The vehicle of claim 1, wherein the anti-pooling countermeasure and the vehicle body are formed from a single piece of material.

7. The vehicle of claim 6, wherein the anti-pooling countermeasure is stamped into the vehicle body.

8. The vehicle of claim 1, wherein the anti-pooling countermeasure includes:

a first diverter; and a second diverter spaced from the first diverter.

9. The vehicle of claim 8, wherein the first diverter and the second diverter are spaced axially from each other along a length of the vehicle body.

10. The vehicle of claim 8, wherein the first diverter and the second diverter are spaced laterally from each other along a width of the vehicle body.

11. A vehicle comprising:

a rear door movable between closed and open positions;

a vehicle body supporting the rear door; and an anti-pooling countermeasure unitarily formed with the vehicle body and configured to direct water laterally outward along the vehicle body to inhibit water collection between the vehicle body and the rear door, the anti-pooling countermeasure extending at an obtuse angle in relation to a reference axis that extends in generally parallel relation to a length of the vehicle body.

12. The vehicle of claim 11, wherein the anti-pooling countermeasure includes:

a first diverter; and a second diverter spaced from the first diverter.

13. The vehicle of claim 12, wherein the first diverter and the second diverter define an axial gap therebetween extending in generally parallel relation to the length of the vehicle body.

14. The vehicle of claim 13, wherein the first diverter and the second diverter are connected such that the anti-pooling countermeasure includes an outer wall extending continuously therebetween.

15. The vehicle of claim 13, wherein the second diverter is nested within the first diverter.

16. The vehicle of claim 12, wherein the first diverter and the second diverter define a lateral gap therebetween extending in generally parallel relation to a width of the vehicle body.

17. A method of inhibiting water collection between a vehicle body and a rear door connected to the vehicle body, the method comprising:

directing water via an anti-pooling countermeasure unitarily formed with the vehicle body such that the water flows at an obtuse angle in relation to a reference axis extending in generally parallel relation to a length of the vehicle body.

18. The method of claim 17, wherein directing water via the anti-pooling countermeasure includes directing water via a diverter protruding outwardly from the vehicle body.

19. The method of claim 17, wherein directing water via the anti-pooling countermeasure includes directing water through a diverter recessed into the vehicle body.

20. The method of claim 17, wherein directing water via the anti-pooling countermeasure includes:

directing water via a first diverter; and directing water via a second diverter spaced from the first diverter.

* * * * *